(12) United States Patent
Ryf

(10) Patent No.: US 7,750,286 B2
(45) Date of Patent: Jul. 6, 2010

(54) COMPACT IMAGE PROJECTOR HAVING A MIRROR FOR REFLECTING A BEAM RECEIVED FROM A POLARIZATION BEAM SPLITTER BACK TO THE POLARIZATION BEAM SPLITTER

(75) Inventor: Roland Ryf, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 541 days.

(21) Appl. No.: 11/765,155

(22) Filed: Jun. 19, 2007

(65) Prior Publication Data

US 2009/0009719 A1  Jan. 8, 2009

(51) Int. Cl.
    *H01J 3/14* (2006.01)
(52) U.S. Cl. .................... 250/216; 250/208.1
(58) Field of Classification Search .......... 250/216, 250/208.1, 225; 353/20, 29, 37; 349/5, 8, 349/9; 359/634, 638
    See application file for complete search history.

(56) References Cited

U.S. PATENT DOCUMENTS

| | | | |
|---|---|---|---|
| 4,834,476 A | 5/1989 | Benton | 350/3.76 |
| 4,986,619 A | 1/1991 | Walker et al. | 350/3.61 |
| 5,172,251 A | 12/1992 | Benton et al. | 359/9 |
| 5,239,322 A | 8/1993 | Takanashi et al. | 353/31 |
| 5,327,270 A * | 7/1994 | Miyatake | 349/9 |
| 5,506,597 A | 4/1996 | Thompson et al. | 345/85 |
| 5,596,451 A | 1/1997 | Handschy et al. | 359/633 |
| 5,617,227 A | 4/1997 | De Bougrenet De La Tocnaye et al. | 349/57 |
| 5,798,819 A | 8/1998 | Hattori et al. | 353/33 |
| 5,834,331 A | 11/1998 | Razeghi | 438/40 |
| 6,211,848 B1 | 4/2001 | Plesniak et al. | 345/1 |
| 6,323,984 B1 | 11/2001 | Trisnadi | 359/245 |
| 6,426,836 B2 | 7/2002 | Dorsel et al. | 359/443 |
| 6,577,429 B1 | 6/2003 | Kurtz et al. | 359/279 |
| 6,594,090 B2 | 7/2003 | Kruschwitz et al. | 359/707 |

(Continued)

FOREIGN PATENT DOCUMENTS

EP  1 283 434 A2  2/2003

(Continued)

OTHER PUBLICATIONS

U.S. Appl. No. 11/713,483, filed Mar. 2, 2007, G. Chen, et al.

(Continued)

*Primary Examiner*—Que T Le
(74) *Attorney, Agent, or Firm*—Mendelsohn, Drucker & Associates, P.C.; Yuri Gruzdkov; Steve Mendelsohn

(57) ABSTRACT

A representative embodiment of the invention provides a compact image projector having a light source coupled to a spatial light modulator (SLM). The light source has a substantially planar structure. The overall size of the SLM is dominated by its length and/or width. The projector has an optical arrangement that enables the SLM to be oriented so that the SLM's dominant dimensions are parallel to the plane of the light source. Due to this relative orientation of the SLM and light source, one of the dimensions of the image projector can be smaller than 12 mm, which advantageously enables incorporation of the projector into a hand-held electronic device, such as a cell phone, PDA, or media player.

20 Claims, 7 Drawing Sheets

U.S. PATENT DOCUMENTS

| | | | |
|---|---|---|---|
| 6,600,590 B2 | 7/2003 | Roddy et al. | 359/287 |
| 6,625,381 B2 | 9/2003 | Roddy et al. | 385/147 |
| 6,791,739 B2 | 9/2004 | Ramanujan et al. | 359/279 |
| 6,797,983 B2 | 9/2004 | Chen et al. | 257/59 |
| 6,876,484 B2 | 4/2005 | Greywall | 359/291 |
| 6,902,276 B2 | 6/2005 | Glenn | 353/98 |
| 6,940,577 B2 | 9/2005 | Kozhukh | 349/156 |
| 6,984,917 B2 | 1/2006 | Greywall et al. | 310/310 |
| 7,099,063 B2 | 8/2006 | Greywall | 359/290 |
| 7,138,648 B2 | 11/2006 | Kneissl et al. | 257/14 |
| 7,268,852 B2 | 9/2007 | Kuan et al. | 349/165 |
| 7,307,786 B2 | 12/2007 | Hatjasalo et al. | 359/569 |
| 7,502,160 B2 | 3/2009 | Aksyuk et al. | 359/290 |
| 2002/0034710 A1 | 3/2002 | Morris et al. | 430/321 |
| 2003/0165013 A1 | 9/2003 | Doany et al. | 359/485 |
| 2004/0239880 A1 | 12/2004 | Kapellner et al. | 353/20 |
| 2005/0219675 A1 | 10/2005 | Aksyuk et al. | 359/224 |
| 2006/0028961 A1 | 2/2006 | Kim et al. | 369/112.01 |
| 2006/0066964 A1 | 3/2006 | Greywall | 359/849 |
| 2006/0126151 A1 | 6/2006 | Aksyuk et al. | 359/291 |
| 2006/0267449 A1 | 11/2006 | Aksyuk et al. | 310/309 |
| 2007/0046907 A1 | 3/2007 | Shin | 353/119 |
| 2007/0279731 A1 | 12/2007 | Blumberg | 359/291 |
| 2008/0212159 A1 | 9/2008 | Giles et al. | 359/238 |

FOREIGN PATENT DOCUMENTS

| | | |
|---|---|---|
| EP | 1 292 134 A2 | 3/2003 |
| EP | 1 734 771 A1 | 12/2006 |
| EP | 1 750 441 A2 | 2/2007 |
| WO | WO 2004/064410 A1 | 7/2004 |

OTHER PUBLICATIONS

U.S. Appl. No. 11/713,207, filed Mar. 2, 2007, R. Giles, et al.

U.S. Appl. No. 11/713,155, filed Mar. 2, 2007, V. Aksyuk, et al.

"PVPro Enabling personal video projectors", Light Blue Optics Ltd., available online at: www.lightblueoptics.com, (2006) 5 pages.

R.W. Gerchberg and W.O. Saxton, "Phase Determination from Image and Diffraction Plane Pictures in the Electron Microscope", OPTIK, vol. 34, No. 3 (1971), pp. 275-284.

R.W. Gerchberg and W.O. Saxton, "A Practical Algorithm for the Determination of Phase from Image and Diffraction Plane Pictures" OPTIK, vol. 35, No. 2 (1972), pp. 237-246.

"A Tail of Two Cats", published on line at: http://www.ysbl.york.ac.uk/~cowtan/fourier/coeff.html, Dec. 15, 2006, 3 pages.

K. Greene, "Pocket Projectors" published on line at: http://www.technologyreview.com/BizTech/17860/, Technology Review, Dec. 6, 2006, 3 pages.

K. Greene, "Ultra-Colorful TV" published online at; http://www.technologyreview.com/read_article.aspx?id=17651&ch=infotech&sc=&pg=2, Technology Review, Oct. 24, 2006, pp. 1-4.

Lucente, Mark, "Diffreaction-Specific Fringe Computation for Electron-Holography," Ph.D Thesis, Dept. of Electrical Engineering and Computer Science, Massachusetts, Institute of Technology, available online at http://www.lucente.biz/pubs/PhDthesis/contents.html, Sep. 1994, abstract, table of contents, and pp. 13-174.

R. W. Gerchberg, "Super-resolution through error energy reduction", OPTICA ACTA, 1974, vol. 21, No. 9, pp. 709-720.

"Novalux Delivers High-Power, Blue, Solid-State Light Sources to Consumer Electronics Partners", published on line at: http://novalux.com/company/press.php?release=5, Nov. 7, 2005, 2 pages.

U.S. Appl. No. 11/681,376, V. Aksyuk, et al.

U.S. Appl. No. 12/017,984, filed Jan. 22, 2008, Gang Chen, et al.

U.S. Appl. No. 12/017,440, filed Jan. 22, 2008, Gang Chen, et al.

U.S. Appl. No. 12/009,991, filed Jan. 22, 2008, Gang Chen, et al.

U.S. Appl. No. 12/009,851, filed Jan. 22, 2008, Gang Chen, et al.

"DC-DC Converter Basics" published on line at: http://www.powerdesigners.com/InfoWeb/design_center/articles/DC-DC/converter.shtm, 12 pages.

"Study of A New Ytterbium Doped Phosphate Laser Glass," by Dai Shixun et al., Chinese Science Bulletin, vol. 47, No. 3, Feb. 2002, pp. 255-259.

"A Tunable, Short, (5cm) Glass Fiber Laser for Helium Optical Pumping," L.D. Schearer et al, Journal De Physique IV, Article published online by EDP Sciences and available at http://dx.doi.org/10.1051/jp4:1991787, 4 pages.

"Spectrum Stability of a Broadband 1060nm Nd-Doped Fibre Laser," Electronics Letters, vol. 26, No. 13, Jun. 21, 1990, 3 pages.

"Efficient Second Harmonic Generation of Femtosecond Laser at 1μm," by Heyuan Zhu et al., May 17, 2004, vol. 12, No. 10, Optics Express 2150, 6 pages.

"Polarization Engineering for LCD Projection," by M. G. Robinson, J. Chen, G. D. Sharp, Wiley, Chichester (England), 2005, Chapter 11, pp. 257-275.

"Perceived Speckle Reduction in Projection Display Systems" by Kerigan, SC et al., IP.com Journal, IP.com Inc., IP.com No. IPCOM000118774D; West Henrietta, NY, Jul. 1, 1997, XP-013106711.

"Some Fundamental Properties of Speckle" by J. W. Goodman, Journal of the Optical Society of America, American Institute of Physics, New York, vol. 66, No. 11, Nov. 1, 1976, pp. 1145-1150, XP-002181682.

\* cited by examiner

100

200

200

300

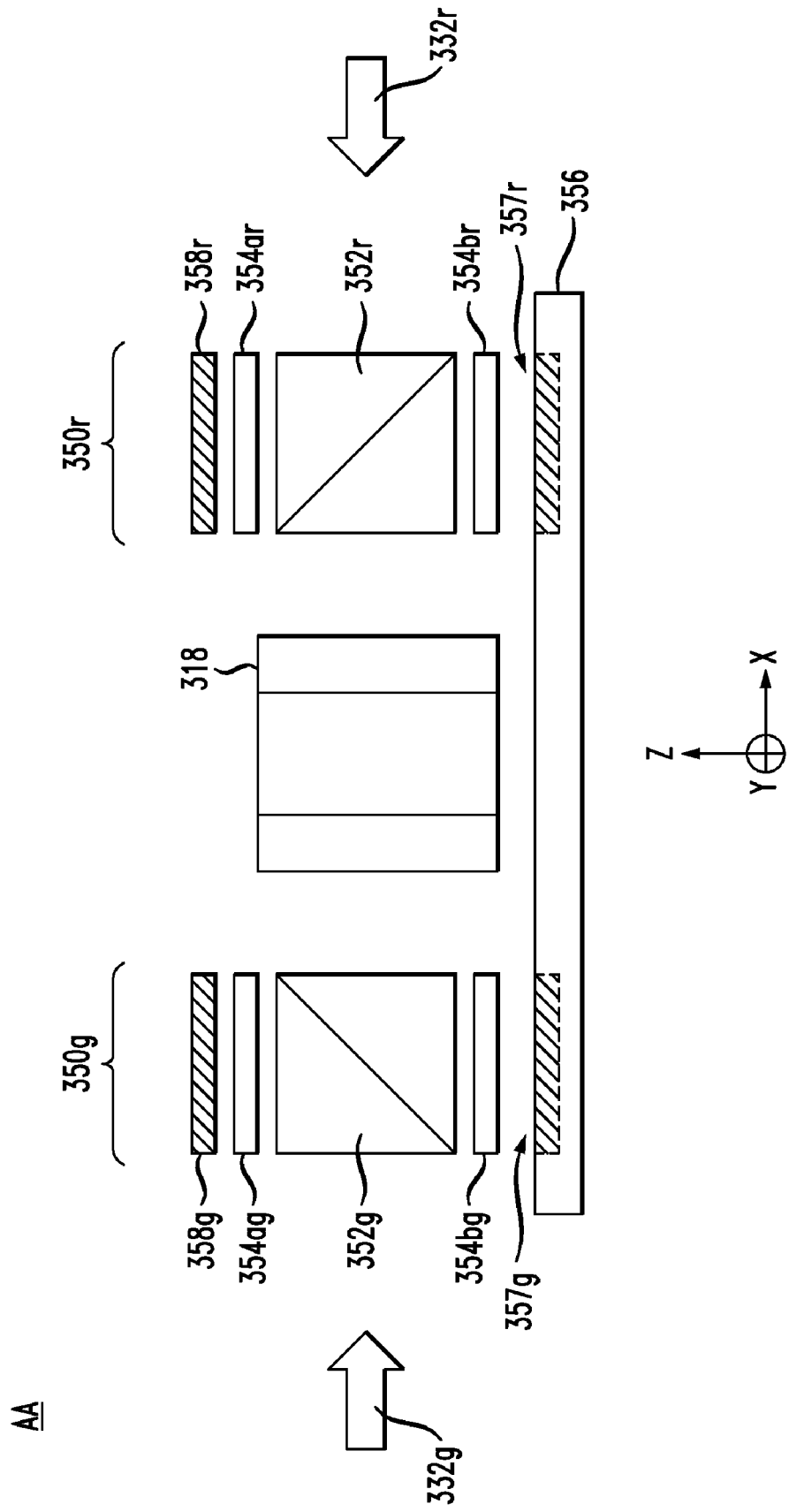

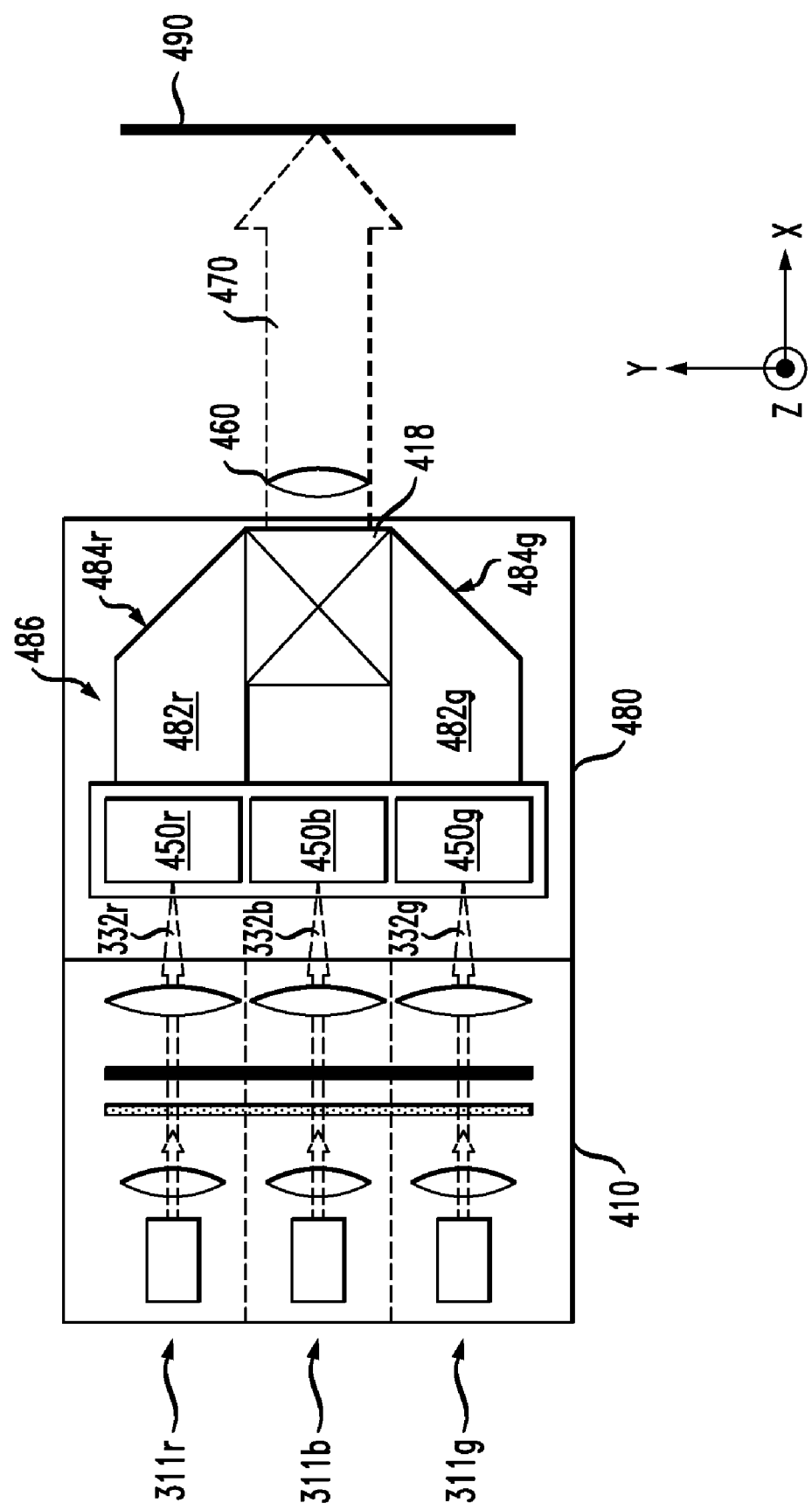

500

COMPACT IMAGE PROJECTOR HAVING A MIRROR FOR REFLECTING A BEAM RECEIVED FROM A POLARIZATION BEAM SPLITTER BACK TO THE POLARIZATION BEAM SPLITTER

BACKGROUND OF THE INVENTION

1. Field of the Invention

The present invention relates to image projectors and hand-held electronic devices.

2. Description of the Related Art

A projector is a device that integrates a light source, optics, electronics, and a light-modulating element for the purpose of projecting an image or a sequence of images, e.g., from a computer or video input, onto a wall or screen for large-image viewing. There are many projectors available in the market, and they are differentiated by their size, resolution, performance, and other features.

SUMMARY OF THE INVENTION

A representative embodiment of the invention provides a compact image projector having a light source coupled to a spatial light modulator (SLM). The light source has a substantially planar structure. The overall size of the SLM is dominated by its length and/or width. The projector has an optical arrangement that enables the SLM to be oriented so that the SLM's dominant dimensions are parallel to the plane of the light source. Due to this relative orientation of the SLM and light source, one of the dimensions of the image projector can be smaller than about 10 mm, which advantageously enables incorporation of the projector into a hand-held electronic device, such as a cell phone, personal digital assistant, or media player.

According to one embodiment, the present invention is a device having: (i) an SLM; (ii) a polarization beam splitter (PBS) optically coupled to the SLM; (iii) a mirror optically coupled to the PBS; and (iv) first and second quarter-wave plates. The PBS is adapted to direct an input beam to the mirror. The mirror is adapted to reflect the beam received from the PBS back to the PBS, wherein the first quarter-wave plate imparts on the reflected beam a first polarization that causes the PBS to direct said reflected beam to the SLM. The SLM is adapted to spatially modulate the beam received from the PBS and direct a resulting spatially modulated beam back to the PBS, wherein the second quarter-wave plate imparts on said spatially modulated beam a second polarization that causes the PBS to direct said spatially modulated beam to an output port to form an output beam.

According to another embodiment, the present invention is a method of spatially modulating a beam of light having the steps of: (A) directing an input beam to a mirror using a PBS; (B) reflecting the beam received from the PBS back to the PBS using said mirror, wherein a first quarter-wave plate imparts on the reflected beam a first polarization that causes the PBS to direct said reflected beam to an SLM optically coupled to the PBS; (C) spatially modulating the beam received by the SLM from the PBS; and (D) directing a resulting spatially modulated beam back to the PBS, wherein a second quarter-wave plate imparts on said spatially modulated beam a second polarization that causes the PBS to direct said spatially modulated beam to an output port to form an output beam.

BRIEF DESCRIPTION OF THE DRAWINGS

Other aspects, features, and benefits of the present invention will become more fully apparent from the following detailed description, the appended claims, and the accompanying drawings in which:

FIGS. 3A-B depict a projector according to another embodiment of the invention;

FIG. 4 shows a top view of a projector according to yet another embodiment of the invention;

DETAILED DESCRIPTION

A compact image projector, e.g., one that can be incorporated into a cell phone and used to project a relatively large image on a wall or an 8.5"×11" sheet of paper, is of great interest to electronic-equipment manufacturers. While the compactness of modern hand-held electronic devices is advantageous for portability purposes, their relatively small size, by its very nature, creates an inherent disadvantage with respect to the display of visual information. More specifically, the display screen of a cell phone, personal digital assistant (PDA), or portable media player is typically too small to present most documents in their original full-page format and/or graphics and video content at their original resolution. Having a compact image projector instead of or in addition to a regular display screen in a hand-held electronic device would help to solve these problems because it would enable the user to display and view the visual information in its most appropriate form. Accordingly, compact image projectors are being actively developed.

Figure 1:
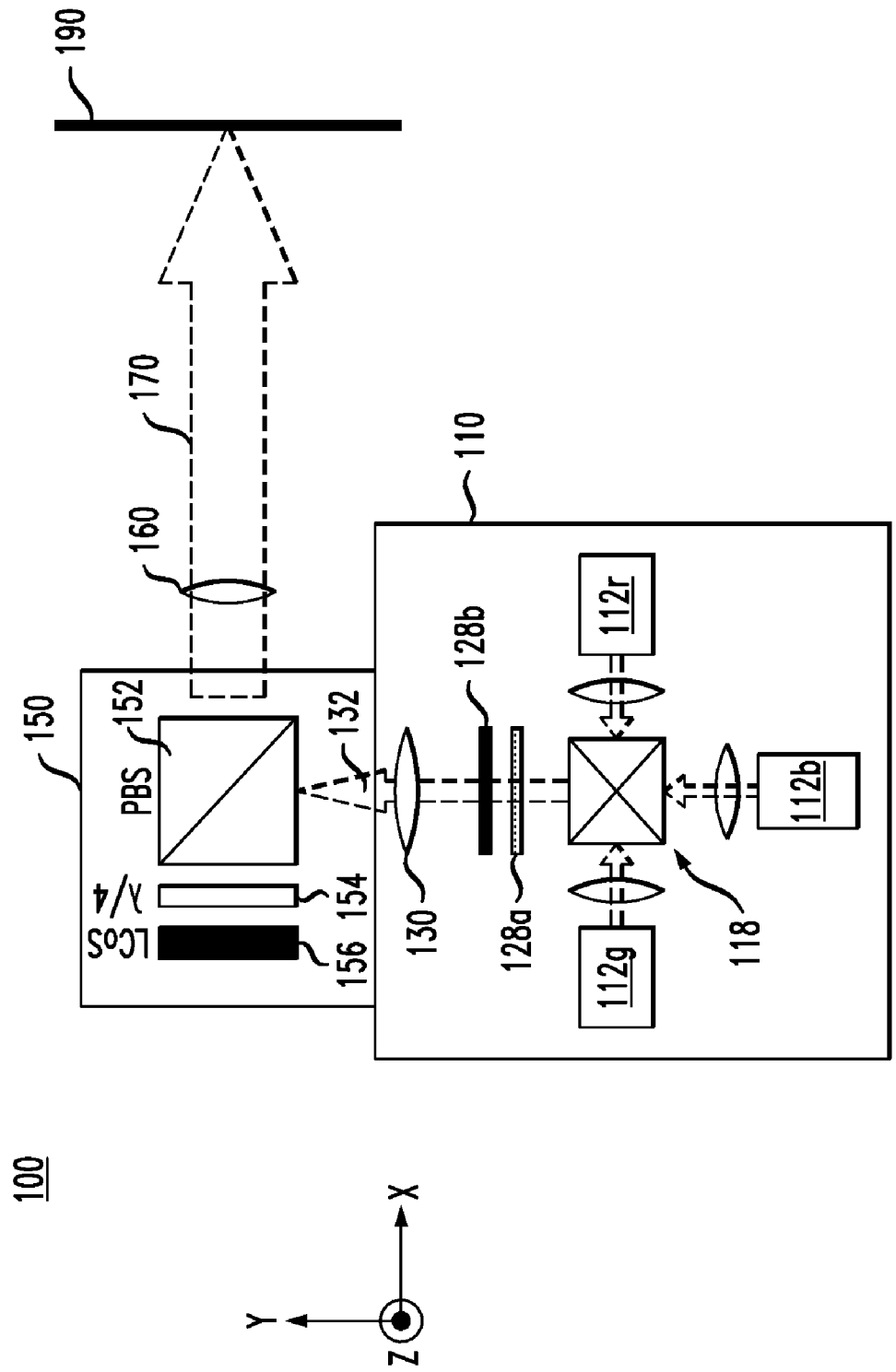
FIG. 1 shows a top view of a prior-art projector.

FIG. 1 shows a top view of a prior-art projector 100. Projector 100 has a light source 110 adapted to feed multi-colored light (e.g., red, green, and blue) into a modulator section 150. Modulator section 150 generates a spatially intensity-modulated beam 170 that, after passing through a projection lens 160, forms a color image on a screen 190.

Light source 110 has a substantially planar arrangement of three lasers 112r, 112g, and 112b, each adapted to generate pulsed light of a designated color, e.g., red, green, and blue, respectively, with the beams generated by the lasers lying in a single plane (parallel to the XY plane of FIG. 1). Lasers 112r, 112g, and 112b are synchronized so that modulator section 150 receives a periodic train of pulses, in which (i) each period has three or more sequential pulses, each pulse of a different color, and (ii) the pulses appear at a designated constant repetition rate. A color combiner (also often referred to as an X-cube) 118 (re)directs the beams generated by lasers 112r, 112g, and 112b toward a collimation/condenser lens 130 that couples an output beam 132 from light source 110 into modulator section 150. Light source 110 may also incorporate one or more lenslets/diffusers 128 that perform beam-shaping and/or speckle-mitigating functions. In FIG. 1, light source 110 is shown as having two lenslets/diffusers 128a-b, both located between color combiner 118 and lens 130. In an alternative embodiment, lenslet/diffuser 128b can be located downstream from lens 130. Light source 110 may further incorporate a polarizer (not explicitly shown) that serves to control, if necessary, the polarization of output beam 132 to enable proper operation of modulator section 150.

Modulator section 150 has a liquid-crystal-on-silicon (LCOS) spatial light modulator (SLM) 156 optically coupled to a polarization beam splitter (PBS) 152 and a quarter-wave ($\lambda$/4) plate 154. A representative LCOS SLM that can be used as SLM 156 is described, e.g., in "Polarization Engineering for LCD Projection," by M. G. Robinson, J. Chen, G. D. Sharp, Wiley, Chichester (England), 2005, Chapter 11, pages 257-275, the teachings of which are incorporated herein by reference. PBS 152 is oriented with respect to the polarization of beam 132 so as to redirect substantially all light of that beam towards SLM 156. Quarter-wave plate 154 is a birefringent plate that produces a retardation of about one quarter of a wavelength between two orthogonal linear polarization components of an optical beam normally passing therethrough. Normally traversing quarter-wave plate 154 two times causes the light directed to SLM 156 and reflected from the pixels of the SLM (i.e., from pixels in the ON state) to acquire the polarization needed to be transmitted by PBS 152. That is, the polarization of such reflected light is such that PBS 152 transmits such light without substantially reflecting the light back toward light source 110. In contrast, the light reflected from the pixels of SLM 156 that are in the OFF state is reflected by PBS 152 back toward light source 110. After being transmitting through PBS 152, the light reflected from the ON-state pixels of SLM 156 forms output beam 170.

Each reflection pattern displayed by the ON-state pixels of SLM 156 represents an image to be projected onto screen 190, and the SLM can display a new reflection pattern for each laser pulse. In effect, projection lens 160 images the reflection pattern displayed by SLM 156 onto screen 190. If the pulse repetition rate is sufficiently high (e.g., greater than the so-called flicker fusion rate), then the images corresponding to the three different colors are fused by the human eye, thereby creating a perceived color image. For creating a steady or moving picture, frame delivery rates between 20 and 120 Hz, e.g., 60 Hz, are normally used and, for the overwhelming majority of people, these rates are higher than the flicker fusion rate.

The overall size of projector 100 is controlled by the relative orientation of various components and their shapes and sizes. For example, each laser 112 in light source 110 is a cylinder having a diameter of between about 4 mm and about 9 mm, and a length of about 10 mm. Color combiner 118 is a cube of about 3×3×3 mm$^3$. The various lenses and diffusers in light source 110 are typically tailored to match the respective beam sizes and have diameters not exceeding 5 mm. Thus, light source 110 can typically fit into a box having in-plane (i.e., X and Y) dimensions of about 25×25 mm$^2$, and a height (Z dimension) of about 9 mm.

The size of modulator section 150 is similarly determined by the size of its components. More specifically, PBS 152 is a cube of about 4×4×4 mm$^3$. Quarter-wave plate 154 is typically attached to a side of PBS 152 and has a thickness of less than about 1 mm. The size of SLM 156 depends on the pixel size and the total number of pixels therein. For example, a typical VGA-quality LCOS SLM that can be used as SLM 156 has a two-dimensional array of 640×480 pixels, wherein the linear size of each pixel is about 5 µm, making the total pixel area of about 3.2×2.4 mm$^2$. In addition to the pixel area of the LCOS SLM, the packaging of the LCOS chip significantly contributes to the overall size. More specifically, the smallest commercially available LCOS packages have a width of about 15 mm, a length of about 12 mm, and a thickness of about 3 mm. The height (Z dimension) of modulator section 150 is dominated by either the length or the width of the LCOS SLM used therein and, as such, is at least about 12-15 mm.

In order to make projector 100 mountable on a cell phone, PDA, or portable media player, at least one dimension of the projector needs to be smaller than 10 mm. As clear from the foregoing, the height (Z dimension) of projector 100 is controlled by one of the lateral dimensions of the LCOS SLM employed therein. However, reducing the lateral size of LCOS packages is difficult to achieve because the extra space around the active liquid-crystal area is required for providing mechanical stability, LCOS sealing, wire bonding, and housing onboard electronic components. It is therefore desirable to have a projector whose height (Z dimension) is not controlled by the length or width of the LCOS SLM.

Figure 2A:
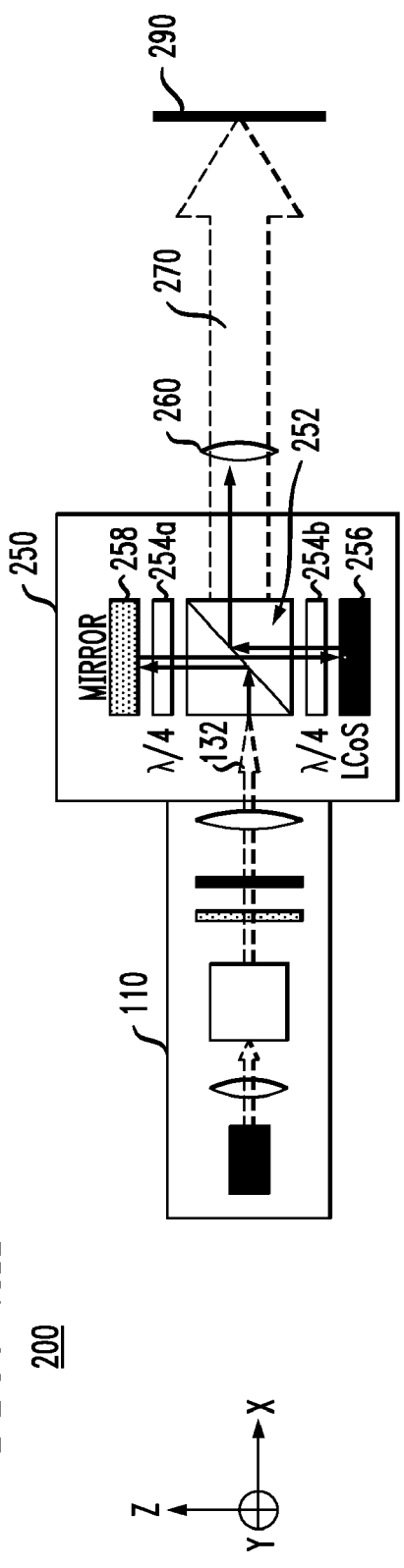
FIGS. 2A-B show side and top views, respectively, of a projector according to one embodiment of the invention.
Figure 2B:
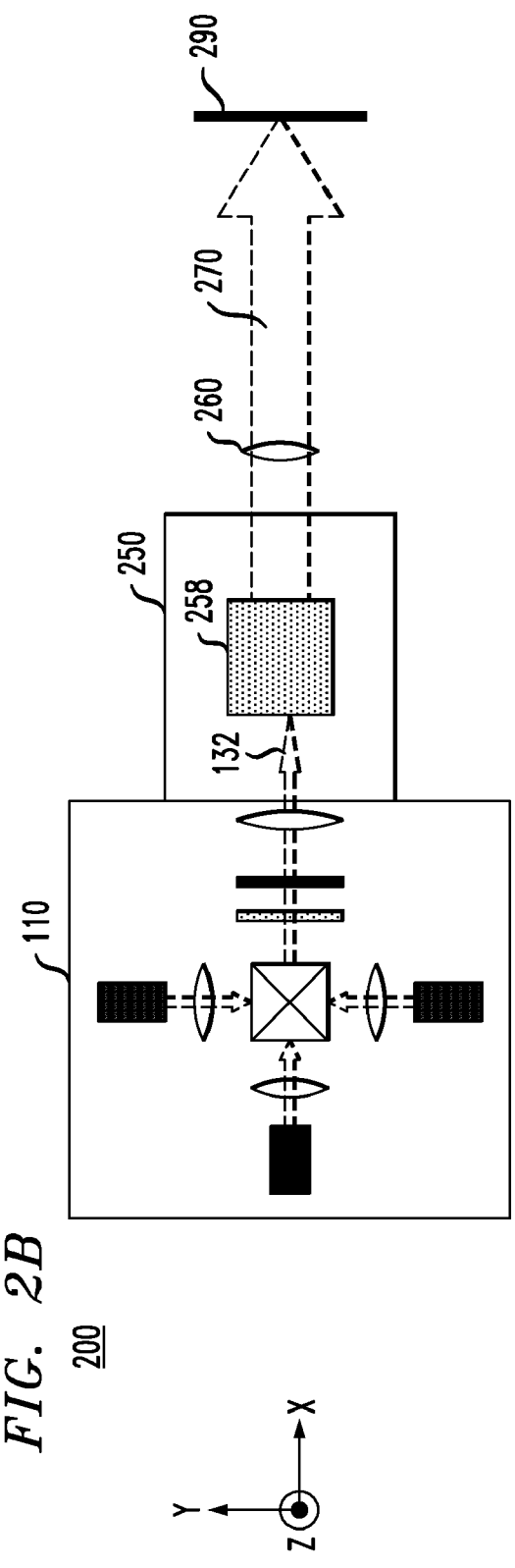

FIGS. 2A-B show side and top views, respectively, of a projector 200 according to one embodiment of the invention. Similar to projector 100 of FIG. 1, projector 200 has light source 110. Light source 110 feeds light into a modulator section 250 that is described in more detail below. A spatially intensity-modulated beam 270 generated by modulator section 250 passes through a projection lens 260 and forms a color image on a screen 290.

Modulator section 250 has an SLM 256 that is analogous to SLM 156 of modulator section 150 (FIG. 1). However, one difference between SLM 156 and SLM 256 is that the latter SLM is oriented so that its dominant dimensions (i.e., the width and length) are parallel to the XY plane, whereas the former SLM is oriented so that one of the dominant dimensions is orthogonal to the XY plane. As a result of this orientation of SLM 256, the height (Z dimension) of modulator section 250 can be reduced compared to that of modulator section 150 and be smaller than 10 mm to advantageously enable incorporation of projector 200 into a hand-held electronic device, such as a cell phone, PDA, or media player.

The above-described orientation of SLM 256 in modulator section 250 is enabled by (i) a different orientation of a PBS 252 with respect to light source 110 than that of PBS 152 in projector 100 and (ii) the addition of a mirror 258 and a second quarter-wave plate 254. More specifically, PBS 252 is oriented with respect to the polarization of beam 132 so as to redirect substantially all light of that beam towards mirror 258. Quarter-wave plate 254a, which is similar to quarter-wave plate 154, produces a retardation of about one quarter of a wavelength so that the light directed to and reflected from mirror 258 acquires a polarization that causes PBS 252 to transmit the reflected light, as opposed to redirecting it back toward light source 110. As a result, the light reflected by mirror 258 goes to SLM 256.

Quarter-wave plate 254b, which is similar to quarter-wave plate 254a, also produces a retardation of about one quarter of a wavelength. As a result, the light directed towards SLM 256 and reflected back from the SLM pixels that are in the ON state acquires a polarization that causes PBS 252 to redirect that light towards projection lens 260, as opposed to transmitting said light towards mirror 258. The redirected light forms output beam 270, which is projected by projection lens 260 onto screen 290.

The Z dimension of modulator section 250 is determined by the cumulative thickness of SLM 256, quarter-wave plates 254a-b, and mirror 258 and the size of PBS 252 (see FIG. 2A). As already indicated above, the thickness of SLM 256 can be about 3 mm, and the thickness of each quarter-wave plate 254 can be less than 1 mm. Mirror 258 can be formed by depositing a relatively thin (e.g., several microns in thickness)

metal layer onto the outer side of quarter-wave plate 254a, thereby making the mirror's thickness negligibly small compared to that of the other components. Since PBS 252 is a cube similar to PBS 152, its Z dimension is about 4 mm. Based on these sizes, the Z dimension of modulator section 250 can be less than 12 mm and can even be as small as about 9 mm or smaller.

In an alternative embodiment, collimation/condenser lens 130 can be placed in the optical path between mirror 258 and SLM 256. Representative benefits of such lens placement may include improvement of the performance and size reduction for projection lens 260. In addition, the removal of lens 130 from light source 110 helps to reduce the size of that light source.

Figure 3A:
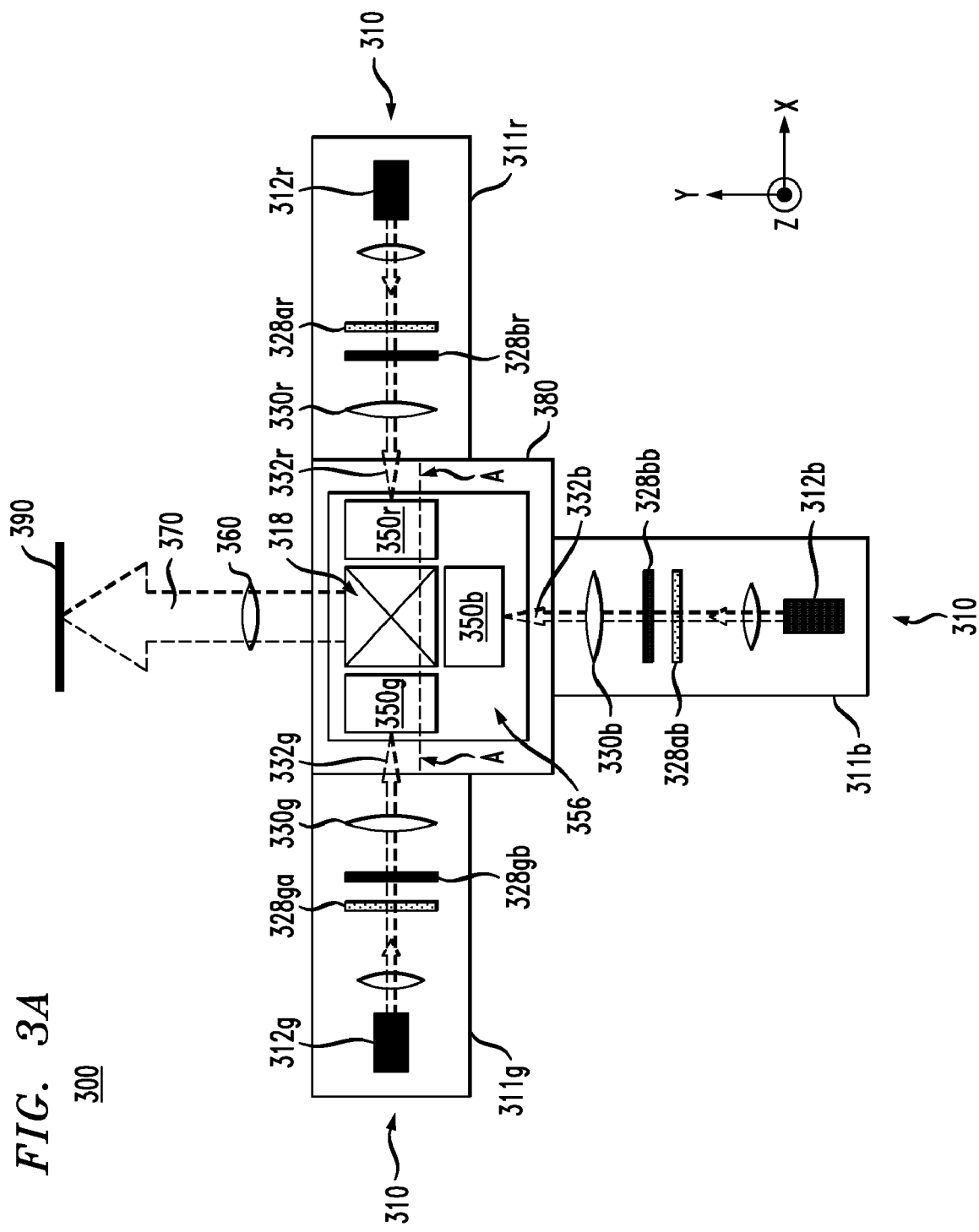

FIGS. 3A-B depict a projector 300 according to another embodiment of the invention. More specifically, FIG. 3A shows a top view of projector 300, and FIG. 3B shows a cross-sectional side view of a modulator section 380 of the projector along the plane labeled AA in FIG. 3A.

Projector 300 differs from projectors 100 and 200 (see FIGS. 1 and 2) in that an SLM 356 used in modulator section 380 has a separate dedicated LCOS area 357 for each of the three colors. Recall that, in projectors 100 and 200, the same LCOS area of the respective SLM is time-division shared by all three colors. One benefit of having a dedicated LCOS area for each color is that each of the lasers feeding the SLM can now stay continuously ON, rather than operating in a pulsed mode, thereby increasing the amount of light pumped by projector 300 into an output beam 370 and the brightness of the image formed by that beam on a screen 390.

Another difference between projector 100 or 200 and projector 300 is that, in the latter, a color combiner (X-cube) 318 is located in modulator section 380. In contrast, in projectors 100 and 200, color combiner 118, which is similar to color combiner 318, is located in light source 110. One result of this placement of color combiner 318 is that it combines spatially intensity-modulated beams generated by three modulator subsections 350r, 350g, and 350b of modulator section 380, whereas color combiner 118 combines the beams generated by lasers 112r, 112g, and 112b, which beams have not yet been spatially intensity-modulated (see, e.g., FIG. 1).

A light source 310 of projector 300 is composed of three subsections 311r, 311g, and 311b, wherein each subsection 311 is adapted to generate light of a designated color and feed that light to the corresponding dedicated LCOS area 357 of SLM 356. Each subsection 311 has a respective laser 312 that can be a pulsed or continuous-wave laser. Each laser 312 directs the generated beam of light toward a respective collimation/condenser lens 330 that shapes it into a respective output beam 332. Each subsection 311 also has two lenslets/diffusers 328 that perform beam-shaping and/or speckle-mitigating functions similar to those of lenslets/diffusers 128 of light source 110.

Each of three modulator subsections 350r, 350g, and 350b of modulator section 380 is analogous to modulator section 250 of projector 200. For example, modulator subsection 350g includes LCOS area 357g, quarter-wave plates 354ag and 354bg, PBS 352g, and mirror 358g (see FIG. 3B). These elements of modulator subsection 350g are analogous to LCOS SLM 256, quarter-wave plates 254a and 254b, PBS 252, and mirror 258, respectively, of modulator section 250 (see FIG. 2B). Each of modulator subsections 350r and 350b is analogous to modulator subsection 350g, as can be seen, e.g., in FIG. 3B, which shows the elements of modulator subsections 350g and 350r side by side. However, one difference between modulator subsection 350 of modulator section 380 and modulator section 250 of projector 200 is that the former performs spatial intensity light modulation for its designated color, rather than for all three colors. As already indicated above, color combiner (X-cube) 318 combines the spatially intensity-modulated beams generated by modulator subsections 350r, 350g, and 350b into output beam 370. A projection lens 360 processes output beam 370 to form a color image on screen 390.

FIG. 4 shows a top view of a projector 400 according to yet another embodiment of the invention. Projector 400 has a light source 410 that, similar to light source 310 of projector 300 (see FIG. 3), has three subsections 311r, 311g, and 311b. However, in light source 410, subsections 311r, 311g, and 311b are placed side by side so that their respective output beams 332r, 332g, and 332b are parallel to each other.

Projector 400 has a modulator section 480 that is generally analogous to modulator section 380 of projector 300 (FIG. 3). More specifically, modulator section 480 has three modulator subsections 450r, 450g, and 450b that are analogous to modulator subsections 350r, 350g, and 350b, respectively. However, modulator subsections 450r, 450g, and 450b form a linear arrangement, whereas modulator subsections 350r, 350g, and 350b form a U-like arrangement. One consequence of this linear arrangement is that the spatially intensity-modulated beams generated by modulator subsections 450r, 450g, and 450b are parallel to each other.

Modulator section 480 further has a beam combiner 486 composed of beam guides 482r and 482g and a color combiner (X-cube) 418. Each beam guide 482 is a piece of glass having a slanted facet 484 oriented at 45 degrees to the light propagation direction and configured to turn the respective spatially intensity-modulated beam impinging onto the facet toward color combiner 418. Facet 484 can reflect light using total internal reflection or an appropriate reflective coating. Color combiner 418, which is similar to color combiner 318 (FIG. 3), receives the two beams reflected by facets 484r and 484g, respectively, and an additional beam coming directly from modulator subsection 450b and then combines these three beams into an output beam 470. A projection lens 460 processes output beam 470 to form a color image on a screen 490.

Figure 5:
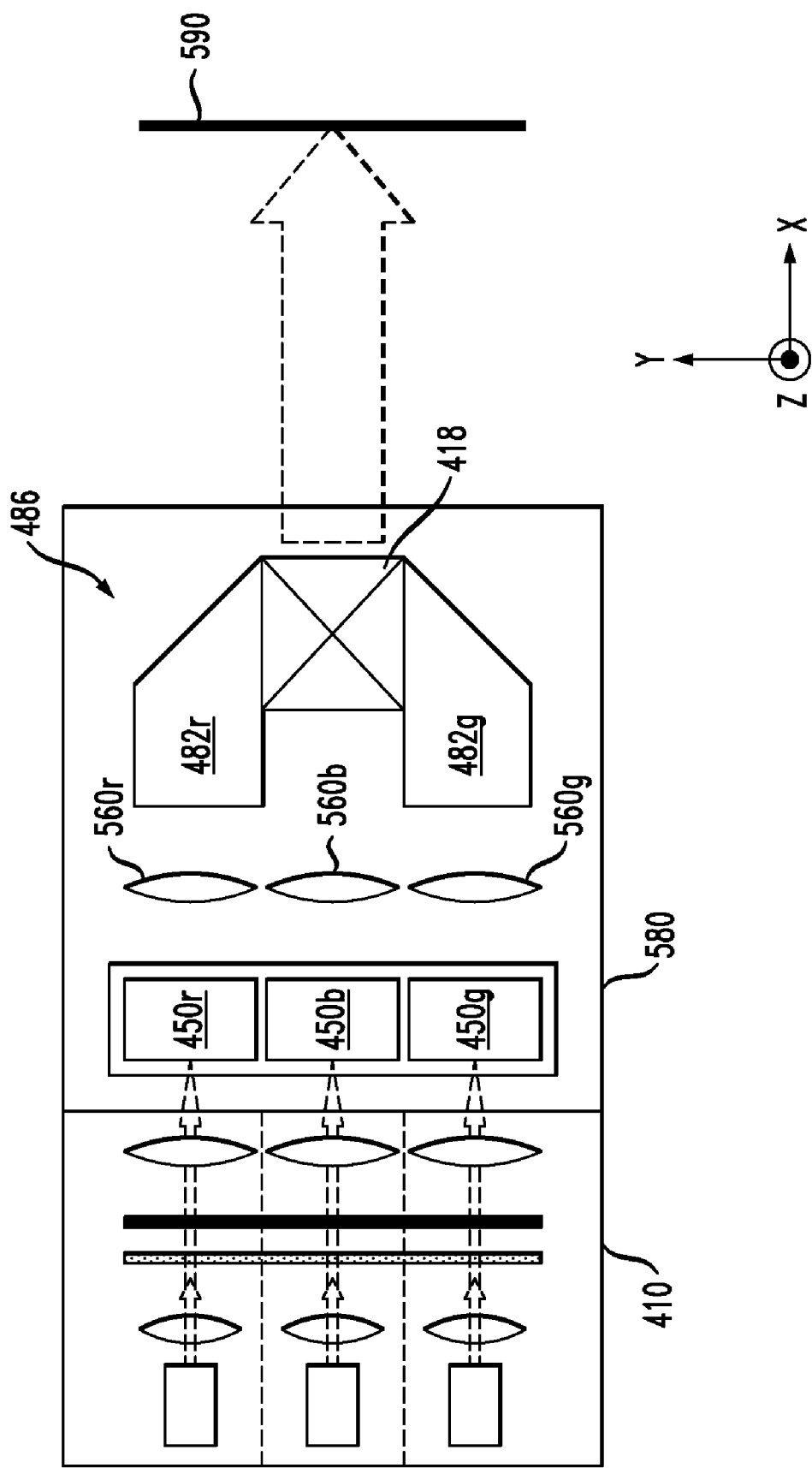
FIG. 5 shows a top view of a projector according to still another embodiment of the invention.

FIG. 5 shows a top view of a projector 500 according to yet another embodiment of the invention. Similar to projector 400 (FIG. 4), projector 500 has light source 410. A modulator section 580 that receives light from light source 410 in projector 500 is similar to modulator section 480 in projector 400 in that it has three modulator subsections 450r, 450g, and 450b coupled to light source 410 and beam combiner 486. However, beam combiner 486 in modulator section 580 is separated from modulator subsections 450r, 450g, and 450b by a gap that accommodates three projection lenses 560r, 560g, and 560b. Although projection lenses 560r, 560g, and 560b in projector 500 perform a function substantially analogous to that of projection lens 460 in projector 400, having a dedicated projection lens for each color can be beneficial because projection with a larger field of view can be obtained.

Each lens 560 processes a respective spatially intensity-modulated beam produced by one of modulator subsections 450r, 450g, and 450b. Beam combiner 486 serves to overlap the processed beams so that the respective monochromatic beams appropriately superimpose on screen 590 to form a corresponding color image on a screen 590.

One skilled in the art will appreciate that, despite the presence of multiple modulator subsections, e.g., modulator subsections 350r, 350g, and 350b in projector 300, each of projectors 300 (FIG. 3), 400 (FIG. 4), and 500 (FIG. 5) can have the projector's Z dimension smaller than about 9 mm.

Figure 6:
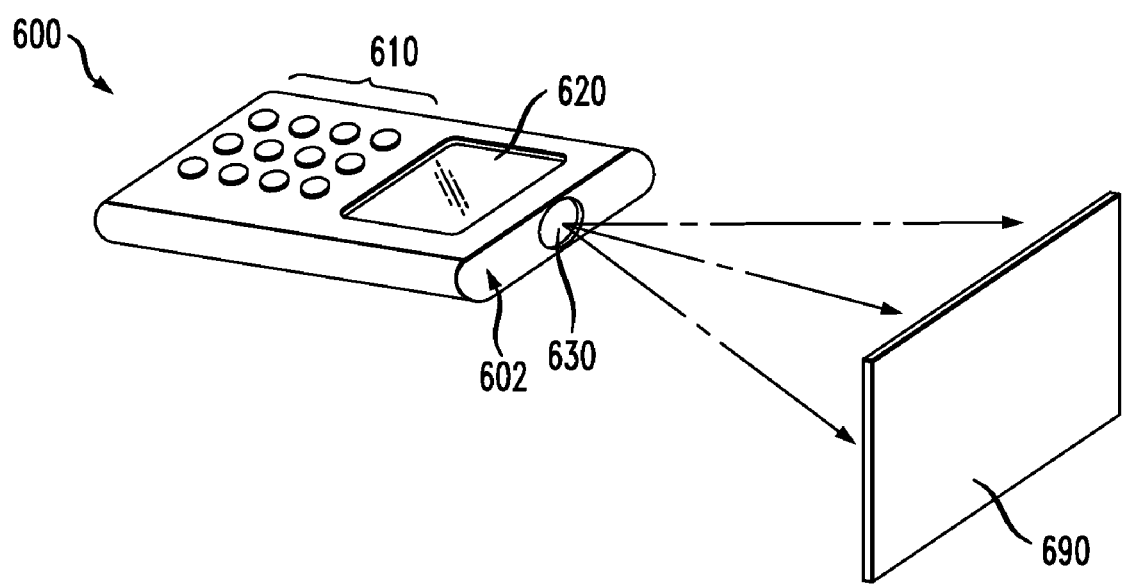
FIG. 6 shows a three-dimensional perspective view of a hand-held electronic device according to one embodiment of the invention.

FIG. 6 shows a three-dimensional perspective view of a hand-held electronic device 600 according to one embodiment of the invention. In various embodiments, device 600 can be a cell phone, PDA, media player, etc. Device 600 has a set of control keys 610 and a relatively small regular display screen 620. A narrow terminal side (edge) of device 600 has an opening 630 that serves as an optical output port for a projector built into the device. In various embodiments, device 600 can incorporate one of projectors 200, 300, 400, and 500. In FIG. 6, the projector of device 600 is illustratively shown as projecting a relatively large image onto a piece 690 of white paper.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where the "length" and "width" lie in a horizontal plane, but would be horizontal where the "length" and "width" lie in a vertical plane, and so on.

I claim:

1. A device, comprising:
a spatial light modulator (SLM);
a polarization beam splitter (PBS) optically coupled to the SLM;
a mirror optically coupled to the PBS; and
first and second quarter-wave plates, wherein:
the PBS is adapted to direct an input beam to the mirror;
the mirror is adapted to reflect the beam received from the PBS back to the PBS, wherein the first quarter-wave plate imparts on the reflected beam a first polarization that causes the PBS to direct said reflected beam to the SLM; and
the SLM is adapted to spatially modulate the beam received from the PBS and direct a resulting spatially modulated beam back to the PBS, wherein the second quarter-wave plate imparts on said spatially modulated beam a second polarization that causes the PBS to direct said spatially modulated beam to an output port to form an output beam.

2. The invention of claim 1, wherein:
the reflecting surface of the mirror and the spatially modulating surface of the SLM are substantially parallel to each other.

3. The invention of claim 2, wherein:
the PBS comprises a beam-splitting cube; and
the mirror and the SLM are optically coupled to respective opposite sides of said cube.

4. The invention of claim 2, wherein the device dimension orthogonal to said surfaces is smaller than 12 mm.

5. The invention of claim 1, further comprising:
a light source adapted to generate the input beam, wherein the device is a projector having at least one dimension smaller than about 9 mm.

6. The invention of claim 1, wherein:
the SLM comprises two or more modulation areas;
for each of said modulation areas, the device comprises a respective instance of the PBS, a respective instance of the mirror, and a respective instance of the first and second quarter-wave plates; and
each instance of the PBS is adapted to receive a respective input beam having light of a respective designated color.

7. The invention of claim 1, wherein:
the SLM comprises three modulation areas; and
the device further comprises three modulator subsections, each subsection having a respective one of said three modulation areas, a respective instance of the PBS, a respective instance of the mirror, and a respective instance of the first and second quarter-wave plates.

8. The invention of claim 7, further comprising:
a beam combiner adapted to combine three spatially modulated beams produced by the three modulator subsections.

9. The invention of claim 8, wherein:
the beam combiner comprises an X-cube;
the three modulator subsections form a U-shaped arrangement, wherein each of said three modulator subsections is optically coupled to a respective side of the X-cube.

10. The invention of claim 8, wherein:
the three modulator subsections form a linear arrangement;
the beam combiner comprises:
an X-cube;
first and second beam guides optically coupled to the X-cube, wherein:
the first beam guide is adapted to couple light from a first of the three modulator subsections to a first side of the X-cube;
the second beam guide is adapted to couple light from a second of the three modulator subsections to a second side of the X-cube;
a third side of the X-cube is adapted to receive light from a third of the three modulator subsections; and
the X cube is adapted to combine the light coupled through the first, second, and third sides to form the output beam.

11. The invention of claim 8, further comprising:
three projection lenses, each located between the respective modulator subsection and the beam combiner.

12. The invention of claim 7, further comprising:
a light source having three subsections, wherein each subsection is adapted to generate the respective input beam for the respective modulator subsection.

13. The invention of claim 12, wherein:
the three respective input beams are parallel to each other.

14. The invention of claim 1, wherein the device is a hand-held electronic device.

15. A method of spatially modulating a beam of light, comprising:
directing an input beam to a mirror using a polarization beam splitter (PBS);
reflecting the beam received from the PBS back to the PBS using said mirror, wherein a first quarter-wave plate imparts on the reflected beam a first polarization that causes the PBS to direct said reflected beam to a spatial light modulator (SLM) optically coupled to the PBS;
spatially modulating the beam received by the SLM from the PBS; and
directing a resulting spatially modulated beam back to the PBS, wherein a second quarter-wave plate imparts on said spatially modulated beam a second polarization that causes the PBS to direct said spatially modulated beam to an output port to form an output beam.

16. The invention of claim 15, wherein:
the reflecting surface of the mirror and the spatially modulating surface of the SLM are substantially parallel to each other.

17. The invention of claim 15, wherein:
the PBS comprises a beam-splitting cube; and
the mirror and the SLM are optically coupled to respective opposite sides of said cube.

18. The invention of claim 15, wherein:
the SLM comprises two or more modulation areas;
each of said modulation areas is optically coupled to a respective instance of the PBS, a respective instance of the mirror, and a respective instance of the first and second quarter-wave plates to form a respective modulator subsection; and
the method further comprises applying to each instance of the PBS a respective input beam having light of a respective designated color.

19. The invention of claim 18, further comprising:
spatially modulating each beam received by the SLM from the respective instance of the PBS; and
combining the resulting two or more spatially modulated beams to form the output beam.

20. The invention of claim 18, wherein:
the two or more respective input beams are parallel to each other.

* * * * *